(12) United States Patent
Mitsunobu et al.

(10) Patent No.: US 12,479,191 B2
(45) Date of Patent: Nov. 25, 2025

(54) STEEL WELDED MEMBER

(71) Applicant: NIPPON STEEL CORPORATION, Tokyo (JP)

(72) Inventors: Takuya Mitsunobu, Tokyo (JP); Keitaro Matsuda, Tokyo (JP); Jun Maki, Tokyo (JP); Takehiro Takahashi, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 55 days.

(21) Appl. No.: 18/288,208

(22) PCT Filed: Apr. 27, 2021

(86) PCT No.: PCT/JP2021/016844
§ 371 (c)(1),
(2) Date: Oct. 25, 2023

(87) PCT Pub. No.: WO2022/230071
PCT Pub. Date: Nov. 3, 2022

(65) Prior Publication Data
US 2024/0227354 A1 Jul. 11, 2024

(51) Int. Cl.
*C22C 38/00* (2006.01)
*B32B 7/14* (2006.01)
(Continued)

(52) U.S. Cl.
CPC ............. *B32B 15/011* (2013.01); *B32B 7/14* (2013.01); *B32B 37/0084* (2013.01);
(Continued)

(58) Field of Classification Search
None
See application file for complete search history.

(56) References Cited

U.S. PATENT DOCUMENTS

| 10,350,701 B2 * | 7/2019 | Miyazaki | ............... B23K 11/34 |
| 2007/0190353 A1 * | 8/2007 | Taniguchi | ............... C21D 9/46 427/329 |

(Continued)

FOREIGN PATENT DOCUMENTS

| AT | 412878 B | 8/2005 |
| EP | 3 733 9240 A1 | 11/2020 |

(Continued)

OTHER PUBLICATIONS

U.S. Office Action for U.S. Appl. No. 18/271,349, dated Sep. 16, 2025.

*Primary Examiner* — Kim S. Horger
(74) *Attorney, Agent, or Firm* — Birch, Stewart, Kolasch & Birch, LLP

(57) ABSTRACT

A steel welded member comprising a plurality of Zn-based plated steel materials, each having a Zn-based plating layer on a surface of a steel material, joined together through at least one spot weld, wherein the steel material contains, by mass %, C: 0.05 to 0.40%, Si: 0.2 to 3.0%, and Mn: 0.1 to 5.0%, the steel welded member includes, by area ratio, 20 to 80% of a $\Gamma$ phase ($Fe_3 Zn_{10}$) and at least one oxide with a long axis of 0.5 μm or more in a region up to 0.5 mm from an end part of a pressure weld of the spot weld.

4 Claims, 2 Drawing Sheets

(51) Int. Cl.
  *B32B 15/01* (2006.01)
  *B32B 37/00* (2006.01)
  *C22C 38/02* (2006.01)
  *C22C 38/06* (2006.01)

(52) U.S. Cl.
  CPC .............. *C22C 38/02* (2013.01); *C22C 38/06* (2013.01); *B32B 2255/06* (2013.01); *B32B 2255/205* (2013.01)

(56) References Cited

U.S. PATENT DOCUMENTS

| | | | |
|---|---|---|---|
| 2010/0055344 A1 | 3/2010 | Ostwald et al. | |
| 2015/0232977 A1* | 8/2015 | Sato | C21D 8/0284 |
| | | | 148/505 |
| 2018/0079026 A1* | 3/2018 | Miyazaki | B23K 11/115 |
| 2018/0243853 A1 | 8/2018 | Yoshinaga et al. | |
| 2019/0001429 A1 | 1/2019 | Sawanishi et al. | |
| 2020/0002803 A1 | 1/2020 | Kwak et al. | |
| 2020/0325554 A1 | 10/2020 | Takeda et al. | |
| 2020/0399745 A1 | 12/2020 | Kwak et al. | |
| 2022/0049330 A1 | 2/2022 | Tanaka et al. | |
| 2023/0349022 A1 | 11/2023 | Suzuki et al. | |

FOREIGN PATENT DOCUMENTS

| | | |
|---|---|---|
| EP | 4 276 206 A1 | 11/2023 |
| JP | 4-218661 A | 8/1992 |
| JP | 2002-105614 A | 4/2002 |
| JP | 2004-18971 A | 1/2004 |
| JP | 2005-103608 A | 4/2005 |
| JP | 2008-38168 A | 2/2008 |
| JP | 2011-117041 A | 6/2011 |
| JP | 2017-47475 A | 3/2017 |
| JP | 6750762 B1 | 9/2020 |
| JP | 2020-179413 A | 11/2020 |
| KR | 10-2018-0081581 A | 7/2018 |
| WO | WO 2019/116531 A1 | 6/2019 |
| WO | WO 2020/130079 A1 | 6/2020 |
| WO | WO 2022/071305 A1 | 4/2022 |
| WO | WO 2022/1495110 A1 | 7/2022 |

\* cited by examiner

STEEL WELDED MEMBER

FIELD

The present invention relates to a steel welded member. More specifically, the present invention relates to a steel welded member having a high corrosion resistance of a spot weld.

BACKGROUND

In recent years, steel sheets used in automobiles, building materials, and other various fields have been made increasingly higher in strength. For example, the use of a high strength steel sheet has increased in the field of automobiles for the purpose of reducing vehicle body weight to improve fuel economy. Such a high strength steel sheet typically includes elements such as C, Si, and Mn to improve the strength of the steel.

In general, such a high strength steel sheet desirably has high corrosion resistance, particularly when used outdoors, so as to secure strength and good appearance. As steel sheet improved in corrosion resistance, a Zn-based plated steel sheet having a Zn-based plating layer (for example, Zn—Al plating layer, Zn—Al—Mg plating layer, etc.) formed on a steel sheet is known.

For example, an automotive member formed using Zn-based plated steel sheets is usually obtained by shaping steel sheets by press-forming, etc., then assembling them by welding (for example, spot welding). Accordingly, in a member comprised of a plurality of plated steel sheets joined through welds, not only the corrosion resistance of the plated steel sheets themselves, but also the corrosion resistance of the welds (for example, spot welds) is sought. In general, it is known that the welds are inferior in corrosion resistance compared with sound parts which are not welded.

In relation to this, PTL 1 discloses an evaporation plated metal material excellent in corrosion resistance, adhesion, and spot weldability on which an SiOx-Zn-based (however, 1.3≤x≤2.1) evaporation plating layer is formed. Further, PTL 2 discloses a method for improving the corrosion resistance, tensile strength, and fatigue strength of a joint comprised of high strength plated steel sheets spot welded together characterized by treating a cracked part of a nugget and a heat affected zone around it by ultrasonic impact from one surface or both surfaces of a spot weld.

CITATIONS LIST

Patent Literature

[PTL 1] Japanese Unexamined Patent Publication No. 4-218661
[PTL 2] Japanese Unexamined Patent Publication No. 2005-103608

SUMMARY

Technical Problem

PTL 1 studies the corrosion resistance, spot weldability, etc., of an evaporation plated metal material, but does not study at all improvement of the corrosion resistance of a spot weld. Further, the invention described in PTL 2 treats the material by ultrasonic impact to repair a crack formed at a spot weld, etc., to thereby prevent penetration of moisture into the crack and raise the corrosion resistance. Therefore, PTL 2 does not necessarily sufficiently study improvement of the corrosion resistance of a spot weld in the state as welded.

The present invention, in consideration of such a situation, has as its object the provision of a steel welded member having high corrosion resistance of a spot weld.

Solution to Problem

The inventors discovered that to solve the above problem, it is important to establish the presence of a predetermined amount of a Γ phase ($Fe_3 Zn_{10}$) and further to establish the presence of coarse oxides (typically including Si, Mg, O, and Fe) near the end part of a pressure weld of a spot weld and discovered that by establishing the presence of the Γ phase and coarse oxides, the corrosion resistance of the spot weld between the Zn-based plated steel materials is greatly improved.

The present invention is based on the above findings and has as its gist the following:

(1) A steel welded member comprising a plurality of Zn-based plated steel materials, each having a Zn-based plating layer on a surface of a steel material, joined together through at least one spot weld, wherein the steel material has a chemical composition comprising, by mass %,
C: 0.05 to 0.40%,
Si: 0.2 to 3.0%,
Mn: 0.1 to 5.0%,
sol. Al: 0 to less than 0.4000%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%,
REM: 0 to 0.100% and
a balance of Fe and impurities, and
the steel welded member comprises, by area ratio, 20 to 80% of a Γ phase ($Fe_3 Zn_{10}$) and at least one oxide with a long axis of 0.5 μm or more in a region up to 0.5 mm from an end part of a pressure weld of the spot weld.

(2) The steel welded member according to (1), wherein the steel welded member comprises at least one oxide with a long axis of 1.5 to 10.0 μm in the region.

(3) The steel welded member according to (1) or (2), wherein the steel welded member further comprises, by area ratio, 5 to 50% of an α phase in the region.

Advantageous Effects of Invention

According to the present invention, it is possible to provide a steel welded member obtained by spot welding a plurality of Zn-based plated steel materials, wherein a Γ phase ($Fe_3 Zn_{10}$) is present in an area ratio of 20 to 80% in a region up to 0.5 mm from an end part of a pressure weld of a spot weld and, further, coarse oxides, specifically oxides with a long axis of 0.5 μm or more, are present in the region, and therefore the contact area of such coarse oxides and the Γ phase increases and the corrosion resistance of the spot weld is greatly improved. As a result, it becomes possible to provide a member excellent in corrosion resistance as a whole, in particular a member for automotive use.

DESCRIPTION OF EMBODIMENTS

<Steel Welded Member>

Figure 1:
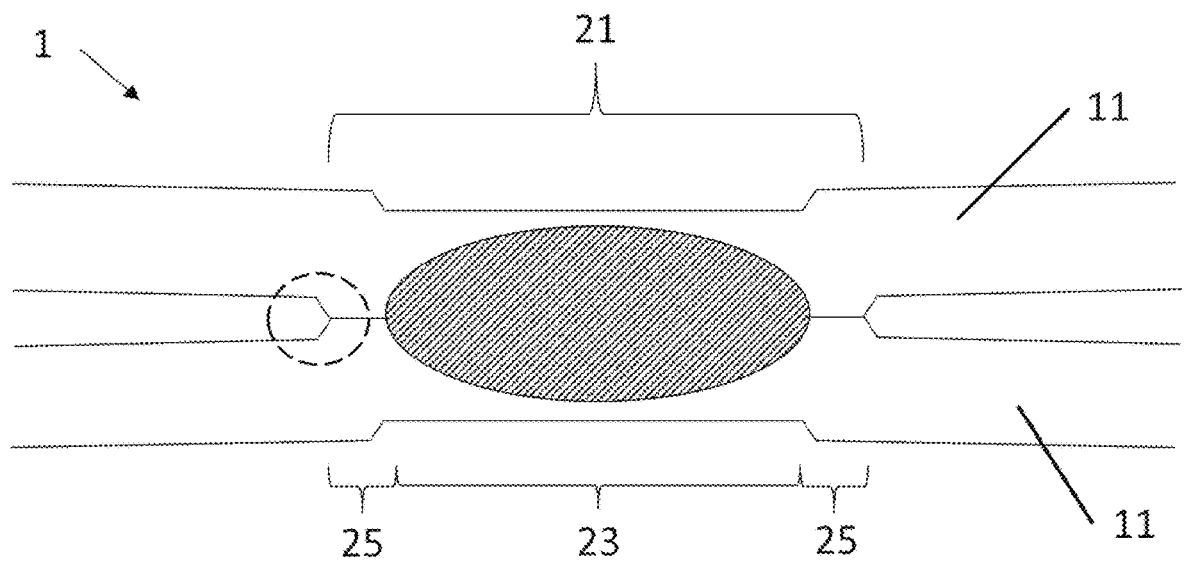
FIG. 1 is a cross-sectional view for explaining a spot weld of an illustrative steel welded member according to the present invention.

The steel welded member according to the present invention comprises a plurality of Zn-based plated steel materials, each having a Zn-based plating layer on a surface of a steel material, joined together through at least one spot weld, wherein the steel material has a chemical composition comprising, by mass %,
C: 0.05 to 0.40%,
Si: 0.2 to 3.0%,
Mn: 0.1 to 5.0%,
sol. Al: 0 to less than 0.4000%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%,
REM: 0 to 0.100% and
a balance of Fe and impurities, and
the steel welded member comprises, by area ratio, 20 to 80% of a Γ phase ($Fe_3 Zn_{10}$) and at least one oxide with a long axis of 0.5 μm or more in a region up to 0.5 mm from an end part of a pressure weld of the spot weld.

In recent years, for example, lighter weight is demanded for improving the fuel efficiency of members for automotive use. To achieve lighter weight, so-called "high strength steel sheet" (for example, tensile strength 440 MPa or more) is used for the members for automotive use. Such a high strength steel sheet, in particular a high strength steel sheet used outdoors, is required to have high corrosion resistance from the viewpoint of securing strength and good appearance. In recent years, as the high strength steel sheet excellent in corrosion resistance, a large amount of Zn-based plated steel sheets comprising steel sheets on which Zn-based platings are formed have been used. On the other hand, a member for automotive use is usually obtained by shaping the above plated steel sheets by press forming, etc., then assembling them into the desired member shape by welding (for example, spot welding). Accordingly, since a member for automotive use includes a spot weld between plated steel materials, high corrosion resistance of the part not only of the plated steel sheets, but also of the spot weld is demanded. On the other hand, the spot weld is inferior in corrosion resistance compared with a sound part which is not welded. For this reason, corrosion proceeds from the spot weld and the strength of the weld falls, whereby sometimes the properties desired as a member for automotive use (in particular, properties relating to strength) can no longer be secured.

Therefore, the inventors studied in detail the method for improving the corrosion resistance of a spot weld. As a result, they discovered that by grinding steel materials having a predetermined chemical composition in a specific way as annealing pretreatment and by annealing the under predetermined conditions, forming Zn-based plated layers on the obtained steel materials to obtain Zn-based plated steel materials, and spot welding the Zn-based plated steel materials to prepare a steel welded member, it is possible to greatly improve the corrosion resistance of a spot weld compared with the case of using conventional plated steel materials. When analyzing in detail an end part of a pressure weld of a spot weld of the steel welded member produced in this way, it was learned that an area ratio of 20 to 80% of a Γ phase ($Fe_3 Zn_{10}$) is included in a region up to 0.5 mm from the end part and further that coarse oxides (Si oxides or Mn oxides, etc.) are present in the region. Therefore, they discovered that due to the presence of both the Γ phase and coarse oxides near an end part of a pressure weld, the corrosion resistance of the spot weld is greatly improved compared with a steel welded member fabricated using conventional plated steel materials. It is believed that the reason the corrosion resistance of the spot weld is improved is that the coarse Si and Mn oxides can suppress corrosion of the Zn-based plating by making the Zn-based corrosion products an insulating film. Further, they analyzed the end part of the pressure weld and as a result learned that the corrosion resistance of the spot weld is greatly improved if the contact area of the coarse oxides and Γ phase increases. Therefore, they learned that by securing a sufficient area ratio of the Γ phase, then increasing the diameter and/or number of coarse oxides, it is possible to greatly improve the corrosion resistance of the weld. Therefore, the inventors developed a steel welded member having high corrosion resistance of a spot weld which is extremely advantageous in particular in members for automotive use.

Below: a steel welded member according to the present invention will be explained in detail. The steel welded member according to the present invention comprises a plurality of Zn-based plated steel materials, each having a Zn-based plating layer on the surface of a steel material (for example, a steel sheet), joined together through at least one spot weld. Therefore, the steel welded member is comprised of a plurality of (i.e., two or more) Zn-based plated steel materials assembled by spot welding. Each of the Zn-based plated steel materials comprises a steel material and a Zn-based plated layer formed on the steel material. The steel material and plating layer may include another layer (for example. Ni plating layer, etc.) between them. The steel welded member according to the present invention may include at least one spot weld between the Zn-based plated steel materials and may include two or more spot welds. The Zn-based plated layer may be formed on one surface of the steel material or may be formed on both surfaces. However, to obtain the steel welded member according to the present invention, in at least one of the two Zn-based plated steel materials to be spot welded, the surface having the Zn-based plated layer is the surface for joining by spot welding. FIG. 1 shows a cross-section of a spot weld of an illustrative steel welded member 1 according to the present invention. The steel welded member 1 comprises two Zn-based plated steel materials 11 joined together through a spot weld 21. The spot weld 21 is typically comprised of a nugget 23 and a pressure weld 25.

[Steel Material]

Below, a steel material in the present invention will be explained in detail. The shape of the steel material is not particularly limited, but is preferably a steel sheet. If the steel material in the present invention is a steel sheet, the thickness is not particularly limited, but for example may be 0.1 to 3.2 mm.

(Chemical Composition of Steel Material)

The chemical composition contained in the steel material in the present invention will be explained next. The "%" regarding content of the elements, unless otherwise stated, will mean "mass %". In the numerical ranges in the chemical composition, a numerical range expressed using "to", unless otherwise indicated, will mean a range having the numerical values before and after the "to" as the lower limit value and the upper limit value.

(C: 0.05 to 0.40%)

C (carbon) is an important element for securing the strength of steel. To secure sufficient strength, the C content is 0.05% or more. The C content is preferably 0.07% or more, more preferably 0.10% or more, even more preferably 0.12% or more. On the other hand, if the C content is excessive, the weldability is liable to fall. Accordingly, the C content is 0.40% or less. The C content may also be 0.38% or less, 0.35% or less, 0.32% or less, or 0.30% or less.

(Si: 0.2 to 3.0%)

Si (silicon) is an element effective for improving the strength of steel. To secure sufficient strength and furthermore sufficiently cause the formation of the desired coarse oxides near the end part of the spot weld, the Si content is 0.2% or more. The Si content is preferably 0.3% or more, more preferably 0.5% or more, further preferably 1.0% or more. On the other hand, if the Si content is excessive, deterioration of the surface properties is liable to be triggered. At the time of annealing, oxides are formed at the outer part of the steel member, a plating layer is not suitably formed, and the Γ phase is liable to become difficult to form near the end part of the spot weld. Accordingly, the Si content is 3.0% or less. The Si content may also be 2.8% or less, 2.5% or less, 2.3% or less, or 2.0% or less.

(Mn: 0.1 to 5.0%)

Mn (manganese) is an element effective for obtaining hard structures to improve the strength of steel. To secure sufficient strength and further make the desired coarse oxide form near the end part of the spot weld, the Mn content is 0.1% or more. The Mn content is preferably 0.5% or more, more preferably 1.0% or more, further preferably 1.5% or more. On the other hand, if the Mn content is excessive, the metallographic structure is liable to become uneven due to Mn segregation, and the workability is liable to decline. Furthermore, at the time of annealing, oxides will form at the outer part of the steel member and the plating layer will not be suitably formed and Γ phase is liable to become harder to form near the end part of the spot weld. Accordingly, the Mn content is 5.0% or less. The Mn content may also be 4.5% or less, 4.0% or less, 3.5% or less, or 3.0% or less.

(Sol. Al: 0 to Less than 0.4000%)

Al (aluminum) is an element which acts as a deoxidizing element. The Al content may also be 0%, but to obtain a sufficient deoxidizing effect, the Al content is preferably 0.0010% or more. The Al content is more preferably 0.0050% or more, further preferably 0.0100% or more, further more preferably 0.0150% or more. On the other hand, if the Al content is excessive, it is liable to trigger a reduction in the workability or a deterioration in surface properties. Therefore, the Al content is less than 0.4000%. The Al content may be 0.3900% or less, 0.3800% or less, 0.3700% or less, 0.3500% or less, 0.3400% or less, 0.3300% or less, 0.3000% or less, or 0.2000% or less. The Al content means the content of so-called acid-soluble Al (sol. Al).

(P: 0.0300% or Less)

P (phosphorus) is an impurity generally contained in steel. If excessively containing P, the weldability is liable to decline. Accordingly, the P content is 0.0300% or less. The P content is preferably 0.0200% or less, more preferably 0.0100% or less, even more preferably 0.0050% or less. The lower limit of the P content is 0%, but from the viewpoint of production costs, the P content may be more than 0% or be 0.0001% or more.

(S: 0.0300% or Less)

S (sulfur) is an impurity generally contained in steel. If excessively containing S, the weldability is liable to decline and further the amount of precipitated MnS is liable to increase and the bendability or other workability is liable to fall. Accordingly, the S content is 0.0300% or less. The S content is preferably 0.0100% or less, more preferably 0.0050% or less, even more preferably 0.0020% or less. The lower limit of the S content is 0%, but from the viewpoint of desulfurization costs, the S content may be more than 0% or be 0.0001% or more.

(N: 0.0100% or Less)

N (nitrogen) is an impurity generally contained in steel. If excessively containing N, the weldability is liable to decline. Accordingly, the N content is 0.0100% or less. The N content is preferably 0.0080% or less, more preferably 0.0050% or less, even more preferably 0.0030% or less. The lower limit of the N content is 0%, but from the viewpoint of production costs, the N content may be more than 0% or be 0.0010% or more.

The basic chemical composition of the steel sheet according to the present invention is as explained above. Furthermore the steel sheet may contain, in accordance with need, the following optional elements. Inclusion of these elements is not essential. The lower limits of contents of these elements are 0%.

(B: 0 to 0.010%)

B (boron) is an element which contributes to increasing hardenability and improving strength and further segregates at the grain boundaries to strengthen the grain boundaries and improve toughness. The B content may be 0%, but may be included in accordance with need so as to obtain the above effect. The B content may be 0.0001% or more, 0.0005% or more, or 0.001% or more. On the other hand, from the viewpoint of securing sufficient toughness and weldability, the B content is preferably 0.010% or less and may be 0.008% or less or 0.006% or less as well.

(Ti: 0 to 0.150%)

Ti (titanium) is an element which precipitates during cooling of steel as TiC and contributes to improving strength. The Ti content may be 0%, but may be included in accordance with need so as to obtain the above effect. The Ti content may be 0.001% or more, 0.003% or more, 0.005% or more, or 0.010% or more. On the other hand, if excessively containing Ti, coarse TiN is formed and the toughness is liable to be harmed. For this reason, the Ti content is preferably 0.150% or less and may also be 0.100% or less or 0.050% or less.

(Nb: 0 to 0.150%)

Nb (niobium) is an element which contributes to improving strength through improving hardenability. The Nb content may be 0%, but may be included in accordance with need so as to obtain the above effect. The Nb content may be 0.001% or more, 0.005% or more, 0.010% or more, or 0.015% or more. On the other hand, from the viewpoint of securing sufficient toughness and weldability, the Nb content is preferably 0.150% or less and may also be 0.120% or less, 0.100% or less, or 0.060% or less.

(V: 0 to 0.150%)

V (vanadium) is an element which contributes to improving strength through improving hardenability. The V content may be 0%, but may be included in accordance with need so as to obtain the above effect. The V content may be 0.001% or more, 0.010% or more, 0.020% or more, or 0.030% or more. On the other hand, from the viewpoint of securing sufficient toughness and weldability, the V content is preferably 0.150% or less and may be 0.100% or less or 0.060% or less.

(Cr: 0 to 2.00%)

Cr (chromium) is effective for increasing the hardenability of steel and increasing the strength of steel. The Cr content may be 0%, but may be included in accordance with need so as to obtain the above effect. The Cr content may be 0.01% or more, 0.10% or more, 0.20% or more, 0.50% or more, or 0.80% or more. On the other hand, if excessively containing Cr, Cr carbides are formed in a large amount and conversely the hardenability is liable to be harmed, therefore the Cr content is preferably 2.00% or less and may be 1.80% or less or 1.50% or less.

(Ni: 0 to 2.00%)

Ni (nickel) is an element effective for increasing the hardenability of steel and increasing the strength of steel. The Ni content may be 0%, but may be included in accordance with need so as to obtain the above effect. The Ni content may be 0.01% or more, 0.10% or more, 0.20% or more, 0.50% or more, or 0.80% or more. On the other hand, excessive increase of Ni invites a rise in costs. Therefore, the Ni content is preferably 2.00% or less and may also be 1.80% or less or 1.50% or less.

(Cu: 0 to 2.00%)

Cu (copper) is an element effective for increasing the hardenability of steel and increasing the strength of steel. The Cu content may be 0%, but may be included in accordance with need so as to obtain the above effect. The Cu content may be 0.001% or more, 0.01% or more, 0.10% or more, or 0.50% or more. On the other hand, from the viewpoint of suppressing a drop in toughness, cracking of slabs after casting, and a drop in weldability, the Cu content is preferably 2.00% or less and may be 1.80% or less, 1.50% or less, or 1.00% or less.

(Mo: 0 to 1.00%)

Mo (molybdenum) is an element effective for increasing the hardenability of steel and increasing the strength of steel. The Mo content may be 0%, but may be included in accordance with need so as to obtain the above effect. The Mo content may be 0.01% or more, 0.10% or more, 0.20% or more, or 0.30% or more. On the other hand, from the viewpoint of suppressing a drop in toughness and weldability, the Mo content is preferably 1.00% or less and may also be 0.90% or less or 0.80% or less.

(W: 0 to 1.00%)

W (tungsten) is an element effective for increasing the hardenability of steel and increasing the strength of steel. The W content may be 0%, but may be included in accordance with need so as to obtain the above effect. The W content may be 0.001% or more, 0.01% or more, 0.10% or more, or 0.30% or more. On the other hand, from the viewpoint of suppressing a drop in toughness and weldability, the W content is preferably 1.00% or less and may also be 0.90% or less, 0.80% or less, or 0.60% or less.

(Ca: 0 to 0.100%)

Ca (calcium) is an element contributing to inclusion control, particularly fine dispersion of inclusions, and has the action of increasing toughness. The Ca content may be 0%, but may be included in accordance with need so as to obtain the above effect. The Ca content may also be 0.0001% or more, 0.001% or more, 0.010% or more, or 0.020% or more. On the other hand, if excessively containing Ca, degradation of the surface properties will sometimes appear. For this reason, the Ca content is preferably 0.100% or less and may be 0.080% or less, 0.050% or less, or 0.030% or less.

(Mg: 0 to 0.100%)

Mg (magnesium) is an element contributing to inclusion control, particularly fine dispersion of inclusions, and has the action of increasing toughness. The Mg content may be 0%, but may be included in accordance with need so as to obtain the above effect. The Mg content may also be 0.0001% or more, 0.001% or more, 0.010% or more, or 0.020% or more. On the other hand, if excessively containing Mg, degradation of the surface properties will sometimes appear. For this reason, the Mg content is preferably 0.100% or less and may also be 0.090% or less, 0.080% or less, or 0.050% or less.

(Zr: 0 to 0.100%)

Zr (zirconium) is an element contributing to inclusion control, particularly fine dispersion of inclusions, and has the action of increasing toughness. The Zr content may be 0%, but may be included in accordance with need so as to obtain the above effect. The Zr content may also be 0.001% or more, 0.005% or more, or 0.010% or more. On the other hand, if excessively containing Zr, degradation of the surface properties will sometimes appear. For this reason, the Zr content is preferably 0.100% or less and may be 0.050% or less, 0.040% or less, or 0.030% or less.

(Hf: 0 to 0.100%)

Hf (hafnium) is an element contributing to inclusion control, particularly fine dispersion of inclusions, and has the action of increasing toughness. The Hf content may be 0%, but may be included in accordance with need so as to obtain the above effect. The Hf content may also be 0.0001% or more, 0.0005% or more, 0.001% or more, or 0.010% or more. On the other hand, if excessively containing Hf, degradation of the surface properties will sometimes appear. Therefore, the Hf content is preferably 0.100% or less and may be 0.080% or less, 0.050% or less, or 0.030% or less.

(REM: 0 to 0.100%)

A REM (rare earth element) is an element contributing to inclusion control, particularly fine dispersion of inclusions, and has the action of increasing toughness. The REM content may be 0%, but may be included in accordance with need so as to obtain the above effect. The REM content may also be 0.0001% or more, 0.0005% or more, 0.001% or more, or 0.010% or more. On the other hand, if excessively containing REM, degradation of the surface properties will sometimes appear. For this reason, the REM content is preferably 0.100% or less and may also be 0.050% or less, 0.040% or less, or 0.030% or less. REM is an acronym for rare earth metals and indicates elements belonging to the lanthanide series. A REM is normally added as mischmetal.

In the steel material in the present invention, the balance excluding the above chemical composition is comprised of Fe and impurities. Here, "impurities" mean constituents, etc., which enter from the ore, scraps, and other raw materials and various factors in the production process when industrially producing a steel material.

In the present invention, the chemical composition of the steel material may be analyzed using an elemental analysis technique known to persons skilled in the art. For example, it is performed by inductively coupled plasma-mass spectroscopy (ICP-MS). However, C and S may be measured by combustion-infrared absorption, and N may be measured using inert gas fusion-thermal conductivity. These analyses may be performed on samples taken from the steel material by a method based on JIS G0417: 1999.

[Zn-Based Plated Steel Material]

The Zn-based plated steel material in the present invention is comprised of the above-mentioned steel material on the surface of which a Zn-based plating layer is formed. This Zn-based plating layer may be formed on one surface of the steel material or may be formed on both surfaces. As the Zn-based plating layer, for example, a hot dip galvanized layer, hot dip galvannealed layer, electrogalvanized layer, electrogalvannealed layer, etc., may be mentioned. More specifically, as the plating type, for example, Zn-0.2% Al (GI), Zn-0.09% Al (GA), Zn-1.5% Al-1.5% Mg, or Zn-11% Al-3% Mg-0.2% Si, etc., can be used. In the present invention, the Zn-based plating layer need only contain Zn. Plating layers where the greatest constituent is not Zn are also encompassed. Another layer may also be included between the steel material and Zn-based plating layer.

(Chemical Composition of Zn-Based Plating Layer)

The chemical composition included in a Zn-based plating layer in the present invention will be explained next. The "%" regarding content of the elements, unless otherwise stated, will mean "mass %". In the numerical ranges in the chemical composition of the plating layer, a numerical range expressed using "to", unless otherwise indicated, will mean a range having the numerical values before and after the "to" as the lower limit value and the upper limit value.

(Al: 0 to 60.0%)

Al is an element which is included together with Zn or is alloyed with it and improves the corrosion resistance of the plating layer, therefore may be included in accordance with need. Therefore, the Al content may be 0%. To form a plating layer containing Zn and Al, preferably the Al content is 0.01% or more. For example, it may be 0.1% or more, 0.5% or more, 1.0% or more, or 3.0% or more. On the other hand, even if excessively containing Al, the effect of improvement of the corrosion resistance becomes saturated, therefore the Al content is preferably 60.0% or less. For example, it may be 55.0% or less, 50.0% or less, 40.0% or less, 30.0% or less, 20.0% or less, 10.0% or less, or 5.0% or less.

(Mg: 0 to 15.0%)

Mg is an element which is included together with Zn and Al or is alloyed with the same and improves the corrosion resistance of the plating layer, therefore may be included in accordance with need. Therefore, the Mg content may be 0%. To form a plating layer containing Zn, Al, and Mg, preferably the Mg content is 0.01% or more. For example, it may be 0.1% or more, 0.5% or more, 1.0% or more, or 3.0% or more. On the other hand, if excessively containing Mg, the Mg will not completely dissolve in the plating bath but will float as oxides. If galvanizing by such a plating bath, oxides will deposit on the surface layer causing poor appearance or liable to cause the occurrence of non-plated parts. For this reason, the Mg content is preferably 15.0% or less, for example, may be 10.0% or less or 5.0% or less.

(Fe: 0 to 15.0%)

Fe can be included in the plating layer due to diffusion from the steel material when forming a plating layer containing Zn on the steel material, then heat treating the plated steel material. Therefore, Fe is not included in the plating layer in a state not treated by heat, therefore the Fe content may also be 0%. Further, the Fe content may be 1.0% or more, 2.0% or more, 3.0% or more, 4.0% or more, or 5.0% or more. On the other hand, the Fe content is preferably 15.0% or less, for example, may be 12.0% or less, 10.0% or less, 8.0% or less, or 6.0% or less.

(Si: 0 to 3.0%)

Si is an element which further improves the corrosion resistance if included in a plating layer containing Zn, in particular a Zn—Al—Mg plating layer, therefore may be included in accordance with need. Therefore, the Si content may be 0%. From the viewpoint of improvement of the corrosion resistance, the Si content may for example be 0.005% or more, 0.01% or more, 0.05% or more, 0.1% or more, or 0.5% or more. Further, the Si content may be 3.0% or less, 2.5% or less, 2.0% or less, 1.5% or less, or 1.2% or less.

The basic chemical composition of the Zn-based plating layer is as explained above. Furthermore the Zn-based plating layer may contain, optionally, one or more of Sb: 0 to 0.50%, Pb: 0 to 0.50%, Cu: 0 to 1.00%, Sn: 0 to 1.00%, Ti: 0 to 1.00%, Sr: 0 to 0.50%, Cr: 0 to 1.00%, Ni: 0 to 1.00%, and Mn: 0 to 1.00%. While not particularly limited, from the viewpoint of sufficiently manifesting the actions and functions of the basic constituents forming the Zn-based plating layer, the total content of these optional elements is preferably made 5.00% or less, more preferably 2.00% or less.

At the Zn-based plating layer, the balance besides the above constituents is comprised of Zn and impurities. The "impurities at the Zn-based plating layer" mean constituents such as the raw material entering due to various factors in the production process when producing the plating layer. In the plating layer, as impurities, elements besides the basic constituents and optional constituents explained above may be included in trace amounts in a range not impeding the effect of the present invention.

The chemical composition of the Zn-based plating layer can be determined by dissolving the plating layer in an acid solution containing an inhibitor for inhibiting corrosion of the steel material and measuring the obtained solution by ICP (inductively coupled plasma) emission spectroscopy.

The thickness of the Zn-based plating layer may for example be 3 to 50 µm. Further, the amount of deposition of the plating layer is not particularly limited but for example may be 10 to 170 $g/m^2$ per side. In the present invention, the amount of deposition of the plating layer is determined by dissolving the plating layer in an acid solution containing an inhibitor for inhibiting corrosion of the base iron and finding the change in weight before and after pickling.

[Spot Weld]

The steel welded member according to the present invention includes at least one spot weld between the above-mentioned Zn-based plated steel materials. Therefore, a plurality of (two or more) Zn-based plated steel materials are joined by spot welding. FIG. 1 is a cross-sectional view for explaining a spot weld of an illustrative steel welded member according to the present invention. In FIG. 1, two Zn-based plated steel materials 11 are joined through a spot weld 21. Usually, if two Zn-based plated steel materials 11 are spot welded, as shown in FIG. 1, the portions pressed by the electrodes are formed with a part called a "nugget 23" comprised of the steel constituents and/or plating layer constituents melted and solidified together. Further, at the outside of the nugget 23, a pressure weld 25 where the constituents are joined without melting is formed. Accordingly, the spot weld 21 includes the nugget 23 and pressure weld 25. Typically, it is comprised of only the nugget 23 and pressure weld 25. The nugget 23 and pressure weld 25 differ in chemical compositions, therefore, for example, it is possible to easily differentiate them by a backscattered electron image (BSE image) of a scan electron microscope (SEM). In the present invention, the shape and composition of the nugget 23 are not particularly limited.

(Pressure Weld)

Figure 2:
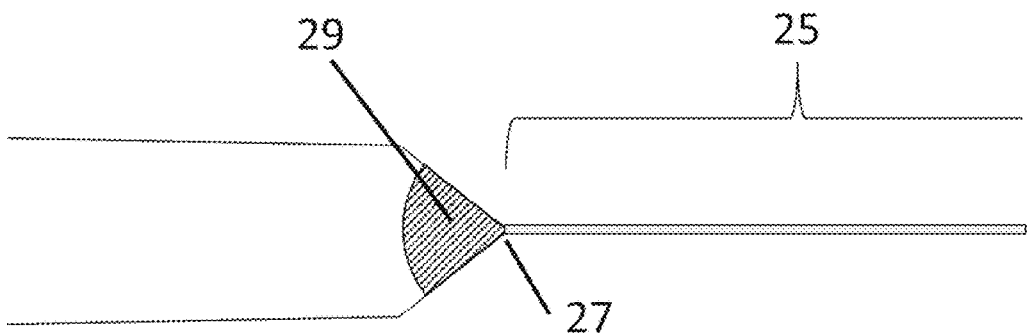
FIG. 2 is a view for explaining an end part and near end part region of a pressure weld of an illustrative steel welded member according to the present invention and an enlarged view of a broken line part of FIG. 1.
Figure 3:
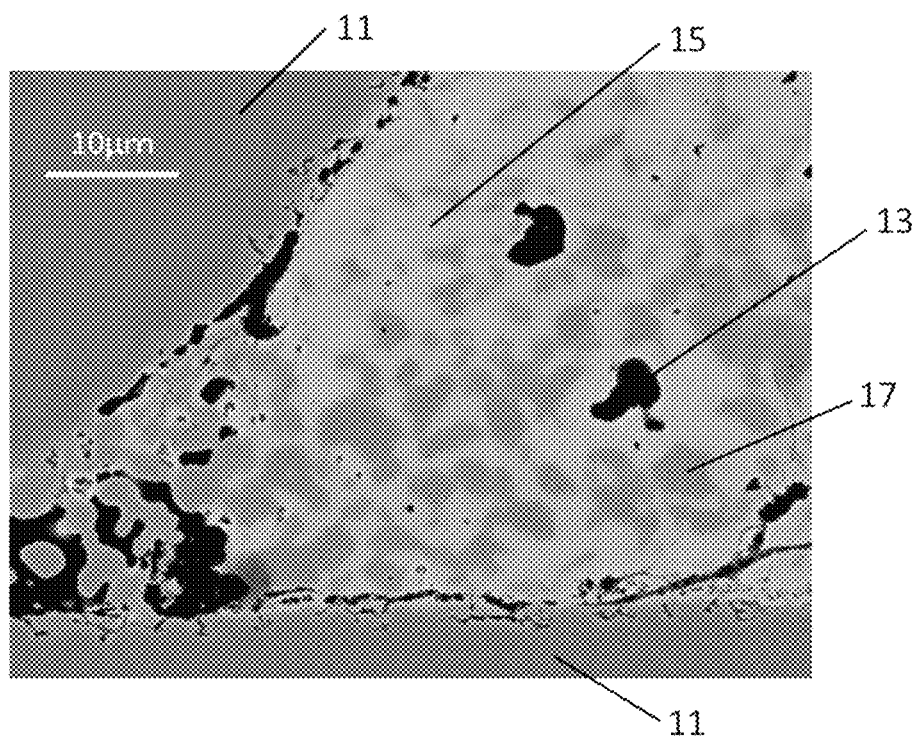
FIG. 3 is a cross-section near an end part of a pressure weld of a spot weld of the illustrative steel welded member according to the present invention observed by a backscattered electron image (BSE) of a scan electron microscope (SEM).

The steel welded member according to the present invention includes 20 to 80 area % of a Γ phase and at least one oxide with a long axis of 0.5 μm or more in a region up to 0.5 mm from an end part of the pressure weld of the spot weld. Preferably, the region includes a Γ phase, α phase, and oxides with a long axis of 0.5 μm or more. Here, in the present invention, the "end part of the pressure weld" refers to an end part of the spot weld at a plurality of Zn-based plated steel materials comprised of a boundary part between a part formed by a plurality of Zn-based plated steel materials joined by welding (pressure weld) and a part where they are not joined. In more detail, the "end part of the pressure weld" is present within the broken lines of FIG. 1 and is shown by numeral 27 in FIG. 2. Therefore, the "region up to 0.5 mm from the end part of the pressure weld" means the region up to 0.5 mm from the boundary of the joined parts and non-joined parts of two Zn-based plated steel materials (numeral 27 of FIG. 2) in the direction opposite to the direction of the nugget 23 (in FIG. 2, the left side) and is shown by numeral 29 (hatching) in FIG. 2. The region 29 up to 0.5 mm from the end part of the pressure weld typically has a shape like a fan, but a shape differing according to the conditions of the spot welding can also be taken. Therefore, in the present invention, the region 29 up to 0.5 mm from the end part of the pressure weld means the region sandwiched between two steel materials in the case of drawing a circle about the end part 27 of the pressure weld. Below, the region of 0.5 mm from the end part of the pressure weld of the spot weld will simply be referred to as the "near end part region". FIG. 3 is a backscattered electron image (BSE image) of a scan electron microscope (SEM) at a cross-section of the near end part region of a pressure weld of a spot weld of the illustrative steel welded member according to the present invention. As will be understood from this BSE image, the near end part region of a spot weld between the two Zn-based plated steel materials 11 includes the oxides 13, Γ phase 15, and α phase 17. In FIG. 3, the black part observed at the interface of the Zn-based plated steel materials 11 and spot weld is believed to be not an oxide, but a crack, etc. This can be identified by elemental analysis.

(Γ Phase)

The steel welded member according to the present invention includes, by area ratio, 20 to 80% of a Γ phase at the near end part region. Here, the "Γ phase" means the Fe—Zn intermetallic compound: $Fe_3Zn_{10}$ having a body centered cubic (bcc) structure. Referring to FIG. 3, the Γ phase 15 (phase appearing light gray) is included in the near end part region present between the plated steel materials 11. This Γ phase, for example, can be easily identified by elemental analysis of the cross-sectional structure of FIG. 3 by an SEM-EDS and calculation of the ratio of composition. If the Γ phase is present in 20 to 80 area % at the near end part region, the contact area between the Γ phase and the later explained oxides will be secured more and the corrosion resistance of the spot weld will be improved. If the area ratio of the Γ phase is less than 20%, the contact area with the later explained oxides is liable to not be sufficiently secured and the desired corrosion resistance of the spot weld is liable to not be obtained. On the other hand, the maximum area ratio of the Γ phase practically able to be formed is 80%, and therefore the area ratio of the Γ phase is 80% or less. The area ratio of the Γ phase at the near end part region is preferably 25% or more, more preferably 30% or more, still more preferably 35% or more.

(α Phase)

The steel welded member according to the present invention may also contain an α phase at the near end part region. The α phase means a ferrite phase in which zinc is dissolved. Referring to FIG. 3, the α phase 17 (phase appearing dark gray) is included in the near end part region present between the plated steel materials 11. This α phase, for example, can be easily identified by elemental analysis of the cross-sectional image of FIG. 3 by an SEM-EDS and calculation of the ratio of composition. The area ratio of the α phase is not particularly limited, but the phase is often formed by a predetermined area ratio if spot welding Zn-based plated steel materials under normal conditions. The area ratio of the α phase at the near end part region is usually 5% or more, for example, may be 10% or more, 15% or more, or 20% or more. The upper limit of the area ratio of the α phase is not particularly limited, but from the viewpoint of forming a sufficient area ratio of the Γ phase and a sufficient size of the later explained oxides, is preferably 50% or less, for example, may be 45% or less, 40% or less, or 35% or less. The steel welded member according to the present invention need not include an α phase at the near end part region. That is, the area ratio of the α phase may be 0%. Alternatively, the near end part region may also be comprised of only oxides, the Γ phase, and the α phase.

(Oxides with Long Axis of 0.5 μm or More)

Referring to FIG. 3, the steel welded member according to the present invention includes coarse oxides 13 at the near end part region. The oxides are assemblages of internal oxides formed inside of the steel materials. The internal oxides can be obtained by predetermined annealing of the steel materials (including pretreatment of annealing). Further, the coarse oxides 13 are oxides containing Si and/or Mn. The Si and/or Mn promote the formation of an insulating film of Zn-based corrosion products in a corrosive environment to thereby greatly contribute to improvement of the corrosion resistance of the steel welded member. The steel welded member according to the present invention includes at least one oxide with a long axis of 0.5 μm or more at the near end part region. Here, the "long axis" of the oxides means the length of the maximum line segment cutting across the oxides. The shape of the oxides is not particularly limited, but may be circular, substantially circular, oval, polygonal, etc. Whatever the shape, the "long axis" means the length of the maximum line segment cutting across the oxides. If the long axis of the oxides is 0.5 μm or more, the contact area with the Γ phase increases and the corrosion resistance of the weld of the steel welded member is greatly improved. The larger the oxides, more specifically the longer the circumference of the oxides, the greater the contact area with the $\Gamma$ phase, therefore the more the effect of improvement of corrosion resistance can be exhibited. Accordingly, the long axis of the oxides present at the near end part region is preferably 0.7 µm or more, more preferably 1.0 µm or more, still more preferably 1.5 µm or more. The upper limit of the long axis of the oxides is not particularly limited, but the long axis of the oxides may be 10.0 µm or less.

In the steel welded member according to the present invention, it is sufficient that one or more oxides with a long axis of 0.5 µm or more be included at the near end part region, but from the viewpoint of increasing the contact area with the $\Gamma$ phase, preferably there may be two or more, three or more, four or more, five or more, 10 or more, or 20 or more oxides with a long axis of 0.5 µm or more. Further, the long axis of the largest oxide in the oxides present in the near end part region (i.e., the maximum long axis of the oxides) may be 0.7 µm or more, 1.0 µm or more, 1.5 µm or more, 2.0 µm or more, or 3.0 µm or more. The maximum long axis of the oxides is not particularly limited, but the maximum long axis of the oxides may, for example, be 10.0 µm or less.

The area ratio of the oxides included in the spot weld is preferably 5 to 45%, more preferably 10 to 40%.

(Chemical Composition of Oxides)

In the present invention, the oxides include one or more of the above-mentioned elements included in the steel material in addition to oxygen and typically have chemical compositions including Si, O, and Fe and in some cases further including Mn. More specifically, the oxides typically contain Si: 5 to 25%, Mn: 0 to 10%, O: 40 to 65%, and Fe: 10 to 30%. The oxides may also contain elements able to be included in the above-mentioned steel sheet (for example, Cr, etc.) in addition to these elements.

[Method of Measurement of Area Ratios of $\Gamma$ Phase and $\alpha$ Phase and Long Axis and Number of Oxides]

The area ratios of the $\Gamma$ phase and $\alpha$ phase are measured using the backscattered electron image (BSE image) of a scan electron microscope (SEM) of the cross-section such as in FIG. 3. Specifically, first, the SEM is used to obtain a BSE image including the end part of the pressure weld. Further, from the BSE image, the end part of the pressure weld (numeral 27 of FIG. 2), then a region up to 0.5 mm from the end part of the pressure weld of the spot weld (near end part region 29) is identified. At the BSE image, oxides are comprised of relatively lighter elements compared with the $\Gamma$ phase and $\alpha$ phase, therefore in the BSE image, are shown the darkest (typically black), so the BSE image is digitalized so as to differentiate the "$\Gamma$ phase and $\alpha$ phase" and the "oxides" so as to identify the contours of the oxides and measure the long axis and number of the oxides. Further, the area ratios of the oxides are calculated based on the digitalized image. In the BSE image, cracks, crevices, etc. (places where nothing is present) also are shown black, but oxides may also be differentiated from using elemental analysis (for example EDS) attached to the SEM, etc. Next, the $\Gamma$ phase is comprised of elements heavier than the $\alpha$ phase. In the BSE image, it is shown the brightest, therefore the BSE image is digitalized so as to differentiate the "$\Gamma$ phase" and "$\alpha$ phase and oxides" to identify the region of the $\Gamma$ phase and calculate the area ratio of the $\Gamma$ phase. Further, the area ratio of the $\alpha$ phase is found by subtracting the found area ratios of the oxides and $\Gamma$ phase and area ratio of the cracks, crevices, etc., from 100%. It is possible to perform general elemental analysis for each phase of the BSE image to differentiate as to whether each phase is the $\Gamma$ phase, $\alpha$ phase, oxides, or other phase.

<Method of Production of Steel Welded Member>

Below, a preferable method of production of the steel welded member according to the present invention will be explained. The following explanation is intended to illustrate the characteristic method for producing the steel welded member according to the present invention and is not intended to limit the steel welded member to one produced by the method of production explained below:

The steel welded member according to the present invention can be obtained by a steel material fabrication step of fabricating the steel materials, a plating step of forming Zn-based plating layers on the surfaces of the steel materials to prepare Zn-based plated steel materials, and a welding step of joining two plated steel materials by spot welding. To obtain a steel welded member according to the present invention, more specifically a steel welded member containing, by area ratio. 20 to 80% of a $\Gamma$ phase and at least one oxide with a long axis of 0.5 µm or more in the near end part region, it is effective to form internal oxides at the surface layer of each steel material (for example, the region up to 50 µm from the surface of the steel material, i.e., the inside of the steel material) in the steel material fabrication step. As such internal oxides, granular oxides dispersed in a granular form inside the crystal grains or on the crystal grain boundaries of the steel, grain boundary oxides present along the crystal grain boundaries of the steel, dendrite oxides present in a dendrite form inside the crystal grains, etc., may be mentioned. If forming, then spot welding Zn-based plating layers in a state forming these internal oxides inside the steel materials, the internal oxides will flow out, together with the molten parts of the steel constituents and plating layer constituents, to near the end part of the pressure weld, i.e., the near end part region, the internal oxides will form assemblages and oxides with a long axis of 0.5 µm or more will become easier to form at the near end part region of the steel welded member. As opposed to this, if oxides are formed in a film state on the surface of the steel materials (outside), i.e., if an external oxidation layer is formed, oxides with a long axis of 0.5 µm or more are liable to be insufficiently formed and the corrosion resistance of the spot weld of the steel welded member is liable to become insufficient. Further, if the plating layer is not suitably formed due to the presence of an external oxidation layer, as a result, the $\Gamma$ phase or oxides are liable to not be formed. To form internal oxides at the surface layer of each steel material, after rolling, it is effective to perform a predetermined annealing pretreatment step (grinding step), then perform an annealing step under predetermined conditions. Below, a steel material fabrication step, plating step, and welding step will be explained using as an example employment of steel sheets as the steel materials. The steel materials may be any shapes. The method of production of the steel welded member in the case of using steel materials other than steel sheets may be suitably changed in accordance with techniques known in the art.

[Steel Material Fabrication Step]

Below, the case of employing steel sheet as the steel materials will be explained. The steel sheet can be obtained for example by performing a casting step of casting molten steel adjusted in chemical composition to form a steel slab, a hot rolling step of hot rolling the steel slab to obtain hot rolled steel sheet, a coiling step of coiling the hot rolled steel sheet, a cold rolling step of cold rolling the coiled hot rolled steel sheet to obtain cold rolled steel sheet, a grinding step of introducing dislocations into the surfaces of the cold rolled steel sheet, and an annealing step of annealing the ground cold rolled steel sheet. Alternatively, the hot rolled steel sheets need not be coiled after the hot rolling step, but pickled and then cold rolled as they are.

(Casting Step)

The conditions of the casting step are not particularly prescribed. For example, after smelting by a blast furnace or electric furnace, etc., various secondary refining operations may be performed, then the molten metal cast by the usual continuous casting, ingot casting, or other method.

(Hot Rolling Step)

The thus cast steel slab can be hot rolled to obtain hot rolled steel sheet. The hot rolling step is performed by directly hot rolling the cast steel slab or by reheating after cooling once. If reheating, the heating temperature of the steel slab may for example be 1100° C. to 1250° C. In the hot rolling step, usually rough rolling and finish rolling are performed. The temperatures and rolling reductions of the rolling operations may be suitably changed in accordance with the desired metallographic structure and sheet thickness. For example, the end temperature of the finish rolling may be made 900 to 1050° C. and the rolling reduction of the finish rolling may be made 10 to 50%.

(Coiling Step)

The hot rolled steel sheet can be coiled at a predetermined temperature. The coiling temperature may be suitably changed in accordance with the desired metallographic structure, etc., and may for example be 500 to 800° C. The hot rolled steel sheet may be heat treated under predetermined conditions before being coiled or after being coiled by being uncoiled. Alternatively, the sheet can be pickled after the hot rolling step without performing a coiling step and then subjected to a later explained cold rolling step.

(Cold Rolling Step)

After pickling the hot rolled steel sheet, the hot rolled steel sheet can be cold rolled to obtain cold rolled steel sheet. The rolling reduction of the cold rolling may be suitably changed in accordance with the desired metallographic structure and sheet thickness and may for example be 20 to 80%. After the cold rolling step, for example, the sheet may be air cooled to cool it down to room temperature.

(Grinding Step)

To sufficiently obtain internal oxides at the surface layers of the steel materials for preparing the steel welded member according to the present invention, it is effective to perform a grinding step before annealing the cold rolled steel sheet. Due to that grinding step, it is possible to introduce a large amount of dislocations to the surface of the cold rolled steel sheet. Oxygen etc., diffuse faster at the grain boundaries than inside the grains, therefore by introducing a large amount of dislocations to the surface of the cold rolled steel sheet, it is possible to form a large number of paths in the same way as the case of grain boundaries. For this reason, at the time of annealing, oxygen easily diffuses (penetrates) to the inside of the steel along these dislocations and the speeds of diffusion of Si and Mn are also improved, therefore as a result, the oxygen bonds with the Si and/or Mn inside of the steel and formation of the above-mentioned granular oxides, grain boundary oxides, and/or dendrite oxides or other internal oxides can be promoted. Further, along with promotion of formation of such internal oxides by the grinding step, the concentrations of Si and Mn in the steel base phase around the internal oxides drop and a depleted layer of Si and Mn is formed at the surface layer of the steel sheet. The grinding step is not particularly limited, but for example can be performed by using a heavy duty grinding brush to grind the surface of cold rolled steel sheet under conditions of an amount of grinding of 10 to 200 g/m². The amount of grinding by the heavy duty grinding brush can be adjusted by any suitable method known to persons skilled in the art. While not particularly limited, for example, it can be adjusted by suitably selecting the number, speed, brushing pressure, coating solution used, etc., of the heavy duty grinding brush. By performing such a grinding step, in the later explained annealing step, it becomes possible to efficiently form the internal oxides at the surface layer of the steel sheet. It is believed that the thus formed internal oxides and Si and Mn depleted layer contribute to formation of the desired near end part region. In particular, when the plating layer and ground iron are alloyed by the spot welding, the internal oxides congregate at the near end part region and form oxides with a long axis of 0.5 µm or more in a form coexisting with the above-mentioned Γ phase.

[Annealing Step]

The cold rolled steel sheet subjected to the above grinding step is preferably annealed. The annealing is preferably performed in a state in which tension is applied to the cold rolled steel sheet in the rolling direction. In particular, in a region where the annealing temperature is 500° C. or more, it is preferable to raise the tension in performing the annealing compared with other regions. Specifically, in a region where the annealing temperature is 500° C. or more, it is preferable to perform the annealing in a state applying 3 to 150 MPa, in particular 15 to 150 Mpa of tension to the cold rolled steel sheet in the rolling direction. If applying tension at the time of annealing, a large amount of dislocations can be more effectively introduced to the surface of the cold rolled steel sheet. Therefore, at the time of annealing, it is made easier for oxygen to diffuse to (penetrate) the inside of the steel along those dislocations and the speeds of diffusion of Si and Mn are also improved, therefore oxides become easier to form inside the steel sheet.

To suitably form internal oxides, the holding temperature of the annealing step is preferably 700 to 900° C., more preferably 720 to 870° C. By setting such a range, it is possible to keep an external oxidation layer from forming and to form oxides at the inside of the steel sheet. If the above holding temperature is less than 700° C., the desired internal oxides are liable to not be sufficiently formed at the time of annealing and coarse oxides are liable to not be able to obtain at the near end part region. If the above holding temperature is more than 900° C., an external oxidation layer is liable to be formed at the time of annealing and a Γ phase is liable to become difficult to form at a near end part region. The temperature elevation rate up to the holding temperature is not particularly limited, but may be 1 to 10° C./s. Further, the temperature elevation may be performed in two stages by a first temperature elevation rate of 1 to 10° C./s and a second temperature elevation rate of 1 to 10° C./s different from the first temperature elevation rate.

The holding time at the holding temperature in the above annealing step is preferably 10 to 300 seconds, more preferably 30 to 250 seconds. By setting such a range, it is possible to keep the external oxidation layer from being formed and form oxides at the inside of the steel sheet. If the holding time is less than 10 seconds, the desired internal oxides are liable to not be sufficiently formed at the time of annealing and coarse oxides are liable to be unable to be obtained at the near end part region. If the holding time is more than 300 seconds, an external oxidation layer is liable to be formed at the time of annealing and a Γ phase is liable to become hard to form at the near end part region.

From the viewpoint of sufficiently causing the formation of internal oxides, the dew point of the atmosphere in the annealing step is preferably −20 to 10° C., more preferably −10 to 5° C. If the dew point is too low; an external oxidation layer is liable to be formed on the surface of the steel sheet and internal oxides liable to not be sufficiently formed, therefore the Zn-based plating layer will not be suitably formed and the desired Γ phase and coarse oxides are liable to not be formed. On the other hand, if the dew point is too high, at the time of annealing, the desired internal oxides will not be sufficiently formed and the desired Γ phase is liable to not be obtained at the near end part region. Further, a large number of drops of water will be formed. This is not preferable in production. Further, the atmosphere in the annealing step more specifically may be a reducing atmosphere containing nitrogen and hydrogen, for example, a reducing atmosphere of hydrogen in 1 to 10% (for example, hydrogen 4% and balance of nitrogen).

Furthermore, it is effective to remove the internal oxidation layer of the steel sheet when performing the annealing step. During the above-mentioned rolling step, in particular the hot rolling step, sometimes an internal oxidation layer is formed at the surface layer of the steel sheet. Such an internal oxidation layer formed in a rolling step is liable to inhibit the formation of internal oxides at the annealing step, so that internal oxidation layer is preferably removed before annealing by pickling, etc. More specifically, the depth of the internal oxidation layer of the cold rolled steel sheet when performing an annealing step may be 0.5 μm or less, preferably 0.3 μm or less, more preferably 0.2 μm or less, still more preferably 0.1 μm or less.

By performing the steps explained above, it is possible to obtain steel sheet comprised of steel sheet inside of which oxides are sufficiently included.

[Plating Step]

The Zn-based plated steel sheet can be obtained by performing a plating step for forming a Zn-based plating layer on the steel sheet produced in the above way. The plating step may be performed according to a method known to persons skilled in the art. The plating step may for example be performed by hot dip coating and may be performed by electroplating. Preferably, the plating step is performed by hot dip coating. The conditions of the plating step may be suitably set considering the chemical composition, thickness, amount of deposition, etc., of the desired plating layer. After the plating, alloying may be performed. Typically, the conditions of the plating step may be set so as to form a plating layer containing Al: 0 to 60.0%, Mg: 0 to 15.0%, Fe: 0) to 15%, and Si: 0) to 3% and having a balance of Zn and impurities. More specifically, the conditions of the plating step may for example be suitably set so as to form for example Zn-0.2% Al (GI), Zn-0.09% Al (GA), Zn-1.5% Al-1.5% Mg, or Zn-11% Al-3% Mg-0.2% Si.

[Welding Step]

In the welding step, two or more sheets of the Zn-based plated steel sheet obtained by the above-mentioned plating step are prepared and spot welded at least at one location. Therefore, due to the welding step, a spot weld is formed between two steel sheets. As a result, it is possible to obtain a steel welded member obtained by joining a plurality of Zn-based plated steel materials, each comprising a steel sheet on the surface of which a Zn-based plating layer is formed, through at least one spot weld. The conditions at the time of spot welding may be conditions known to persons skilled in the art. For example, dome radius type tip diameter 6 to 8 mm welding electrodes can be used with an electrode force of 1.5 to 6.0 kN, weld time of 0.1 to 1.0 s (5 to 50 cycles, power frequency 50 Hz), and weld current 4 to 15 kA.

As explained above, at the time of production of the steel welded member, predetermined steel material fabrication steps (in particular, a grinding step and annealing step) can be performed to prepare a steel material having internal oxides and the steel material may be given a Zn-based coating. The Zn-based plated steel material can be used to fabricate a steel welded member including, by area ratio, 20 to 80% of a Γ phase ($Fe_3 Zn_{10}$) and including at least one oxide with a long axis of 0.5 μm or more in a region up to 0.5 mm from an end part of a pressure weld of a spot weld.

Examples

Below, examples will be used to explain the present invention in more detail, but the present invention is not limited to these examples in any way.

(Preparation of Steel Materials)

Molten steels adjusted in chemical compositions were cast to form steel slabs. The steel slabs were hot rolled, pickled, then cold rolled to obtain cold rolled steel sheets. Next, the sheets were air-cooled down to room temperature. The cold rolled steel sheets were pickled, then the internal oxidation layers formed by rolling were removed down to the internal oxidation layer depth (μm) before annealing described in Table 1. Next, samples were taken from the cold rolled steel sheets by the method based on JIS G0417: 1999 and the chemical compositions of the steel sheets were analyzed by ICP-MS, etc. The measured chemical compositions of the steel sheets are shown in Table 1. The thicknesses of the steel sheets used were 1.6 mm in all cases.

Next, each of the cold rolled steel sheets was coated with an NaOH aqueous solution, then the surface of the cold rolled steel sheet was ground using a heavy duty grinding brush by an amount of 10 to 200 g/m$^2$ (Sample No. 1 no grinding). After that, each was annealed by the dew point, holding temperature, and holding time shown in Table 1 (annealing atmosphere: hydrogen 4% and balance of nitrogen) to prepare each steel sheet sample. In all of the steel sheet samples, the temperature elevation rate at the time of annealing was made 6.0° C./s up to 500° C. and was made 2.0° C./s from 500° C. to the holding temperature. In the above annealing, the cold rolled steel sheet was annealed in the state applying 0.5 MPa or more of tension in the rolling direction. In the region of an annealing temperature of 500° C. or more, compared with other regions, the annealing was performed in the state applying a higher tension in the rolling direction, specifically a tension of 3 to 150 MPa (in Sample No. 116, such tension not applied). The presence of any grinding by a heavy duty grinding brush and the conditions of the annealing (presence of application of tension of 3 to 150 MPa, dew point (° C.), holding temperature (° C.), and holding time (s) in region with annealing temperature of 500° C. or more) are shown in Table 1. In each steel sheet sample, a JIS No. 5 tensile test piece having a direction vertical to the rolling direction as its longitudinal direction was taken. A tensile test was performed based on JIS Z 2241(2011). As a result, in all examples, the tension strengths were 440) MPa or more.

(Preparation of Samples of Zn-Based Plated Steel Materials)

Each of the samples of steel members was cut to 100 mm×200 mm size, then each steel sheet sample was hot dip galvanized, then alloyed. In the hot dip galvanization step, the cut sample was dipped in a 440° C. hot dip galvanization bath for 3 seconds. After dipping, it was pulled out at 100 mm/s. $N_2$ wiping gas was used to control the amount of plating deposition to 50 g/m$^2$. After that, alloying was performed at 460° C. to obtain a sample of a Zn-based plated steel material.

(Preparation of Samples of Steel Welded Members)

Each sample of Zn-based plated steel sheet was cut to 50 mm×100 mm in size to prepare two sheets. These two sheets of the Zn-based plated steel sheet samples were spot welded to obtain a sample of a steel welded member. The conditions of the spot welding were dome radius type tip size 8 mm welding electrodes, an electrode force of 3.0 kN, a weld time of 0.5 second (20 cycles, power frequency 50 Hz), and weld current of 7 kA. Furthermore, each obtained sample of a steel welded member was treated by zinc phosphate (SD5350) system: made by Nippon Paint Industrial Coating, based on standard), then was formed with an electrodeposition coating (PN110 Powermix Grey: made by Nippon Paint Industrial Coating, based on standard of same) to 20 μm and was baked at a 150° C. baking temperature for 20 minutes to obtain a sample for evaluation.

(Analysis of Metallographic Structure at Region 0.5 mm from End Parts of Press Welded Part)

Each sample for evaluation was measured for area ratios of the Γ phase and α phase using a BSE image of an SEM of the cross-section of the welded part. Specifically, first, a sample of the cross-section of the welded part was prepared, then an SEM was used to obtain a BSE image including the end part of the pressure weld, then the end part of the pressure weld and then the region up to 0.5 mm from the end part of the pressure weld of the spot weld (near end part region) were identified from the BSE image. The BSE image was digitalized to enable the "Γ phase and α phase" and the "oxides" to be differentiated at the identified near end part region. Due to this, the contours of the oxides were identified and the long axes and numbers of the oxides observed were measured. Further, the area ratio of the oxides was calculated based on the digitalized image. The cracks, crevices, etc., in the BSE image were differentiated from oxides using an elemental analysis SEM-EDS attached to the SEM. Next, the BSE image was digitalized to differentiate the "Γ phase" and "α phase and oxides" at the near end part region. Due to this, the regions of the Γ phase were identified and the area ratio of the Γ phase was calculated. Further, the area ratio of the α phase was found by subtracting the found area ratios of the oxides and Γ phase and the area ratio of cracks, crevices, etc., from 100%. The area ratios of the Γ phase and α phase, the number of the oxides with a long axis of 0.5 μm or more (number of coarse oxides), and the maximum value of the long axes of the oxides (maximum diameter of oxides) are shown in Table 1.

(Evaluation of Corrosion Resistance of Spot Welded Part)

Each sample of the steel welded member was used for a cyclic corrosion test according to JASO(M609-91). The state of corrosion of the steel material after 120 cycles was used to evaluate the corrosion resistance of the spot weld. Each sample for evaluation was examined by an SEM at a cross-section of a part including the spot weld (nugget and pressure weld) and the steel material after completion of the corrosion test (for example, part such as FIG. 1) was measured. From the examined image, the maximum corrosion depth of the part of the steel material in the range of 1 mm from the near end part region of the pressure weld toward the direction of the steel material (for example, toward upward direction in FIG. 1) was measured. The case where that maximum corrosion depth was 0.1 mm or less was evaluated as "G" (good) and the case where it was more than (0.1 mm was evaluated as "P" (poor). The evaluation of each sample is shown in Table 1.

TABLE 1-1

| No. | Class | Chemical composition (mass %) | | | | | | | | Depth of internal oxidation layer before annealing (μm) | Heavy duty grinding brush |
|---|---|---|---|---|---|---|---|---|---|---|---|
| | | Fe | C | Si | Mn | Al | P | S | N | Others | | |
| 1 | Comp. ex. | Bal. | 0.18 | 1.6 | 2.1 | 0.0298 | 0.0078 | 0.0010 | 0.0022 | | 0.1 | No |
| 2 | Ex. | Bal. | 0.05 | 1.0 | 2.1 | 0.0110 | 0.0043 | 0.0098 | 0.0031 | Ti: 0.091 | 0.1 | Yes |
| 3 | Ex | Bal. | 0.05 | 2.0 | 2.1 | 0.0222 | 0.0232 | 0.0032 | 0.0021 | B: 0.006 | 0.3 | Yes |
| 4 | Ex | Bal. | 0.10 | 0.5 | 2.1 | 0.0234 | 0.0078 | 0.0022 | 0.0023 | W: 0.55 | 0.1 | Yes |
| 5 | Ex. | Bal. | 0.10 | 1.5 | 2.1 | 0.0112 | 0.0114 | 0.0021 | 0.0011 | Mg: 0.047 | 0.2 | Yes |
| 6 | Ex | Bal. | 0.18 | 0.5 | 2.1 | 0.0210 | 0.0113 | 0.0017 | 0.0013 | | 0.1 | Yes |
| 7 | Ex. | Bal. | 0.18 | 1.0 | 2.1 | 0.0150 | 0.0190 | 0.0029 | 0.0024 | Hf: 0.018 | 0.1 | Yes |
| 8 | Ex. | Bal. | 0.18 | 1.8 | 2.1 | 0.0133 | 0.0120 | 0.0021 | 0.0024 | | 0.3 | Yes |
| 9 | Comp. ex. | Bal. | 0.18 | 1.6 | 2.1 | 0.0100 | 0.0122 | 0.0023 | 0.0033 | | 0.2 | Yes |
| 10 | Comp. ex. | Bal. | 0.18 | 1.8 | 2.0 | 0.0240 | 0.0121 | 0.0012 | 0.0010 | | 0.2 | Yes |
| 11 | Comp. ex. | Bal. | 0.18 | 1.6 | 2.0 | 0.0030 | 0.0100 | 0.0020 | 0.0011 | | 0.1 | Yes |
| 12 | Comp. ex. | Bal. | 0.18 | 1.6 | 2.1 | 0.0111 | 0.0099 | 0.0023 | 0.0011 | | 0.3 | Yes |
| 13 | Comp. ex. | Bal. | 0.18 | 1.6 | 2.1 | 0.0209 | 0.0024 | 0.0014 | 0.0011 | | 0.1 | Yes |
| 14 | Comp. ex. | Bal. | 0.18 | 1.6 | 2.1 | 0.0211 | 0.0065 | 0.0015 | 0.0016 | | 0.2 | Yes |
| 15 | Comp. ex. | Bal. | 0.20 | 4.5 | 2.0 | 0.0017 | 0.0032 | 0.0027 | 0.0013 | | 0.1 | Yes |
| 16 | Comp. ex. | Bal. | 0.20 | 1.6 | 6.0 | 0.0110 | 0.0120 | 0.0022 | 0.0027 | | 0.2 | Yes |
| 17 | Comp. ex. | Bal. | 0.40 | 1.6 | 2.0 | 0.0280 | 0.0100 | 0.0011 | 0.0012 | | 9.8 | Yes |
| 18 | Ex. | Bal. | 0.20 | 3.0 | 2.0 | 0.0085 | 0.0099 | 0.0210 | 0.0021 | Cu: 0.81 | 0.4 | Yes |
| 19 | Ex. | Bal. | 0.20 | 1.8 | 5.0 | 0.0124 | 0.0067 | 0.0013 | 0.0024 | REM: 0.032 | 0.2 | Yes |
| 20 | Ex. | Bal. | 0.20 | 1.0 | 2.3 | 0.0250 | 0.0045 | 0.0011 | 0.0022 | Ca: 0.021 | 0.1 | Yes |
| 21 | Ex. | Bal. | 0.20 | 1.8 | 0.7 | 0.0113 | 0.0024 | 0.0022 | 0.0010 | Cr: 1.31 | 0.3 | Yes |
| 22 | Ex. | Bal. | 0.25 | 1.5 | 2.4 | 0.0209 | 0.0080 | 0.0023 | 0.0012 | | 0.1 | Yes |
| 23 | Ex. | Bal. | 0.25 | 1.5 | 2.0 | 0.0214 | 0.0119 | 0.0020 | 0.0012 | Nb: 0.103 | 0.2 | Yes |
| 24 | Ex | Bal. | 0.30 | 1.5 | 2.3 | 0.0244 | 0.0094 | 0.0013 | 0.0013 | | 0.1 | Yes |
| 25 | Ex. | Bal. | 0.30 | 1.8 | 2.0 | 0.0221 | 0.0094 | 0.0011 | 0.0017 | Mo: 0.41 | 0.3 | Yes |
| 26 | Ex. | Bal. | 0.35 | 1.8 | 3.0 | 0.0220 | 0.0145 | 0.0025 | 0.0020 | | 0.1 | Yes |
| 27 | Ex. | Bal. | 0.35 | 1.8 | 2.0 | 0.0203 | 0.0134 | 0.0020 | 0.0024 | V: 0.046 | 0.3 | Yes |
| 28 | Ex. | Bal. | 0.40 | 1.8 | 2.0 | 0.0309 | 0.0106 | 0.0024 | 0.0022 | | 0.3 | Yes |
| 29 | Ex | Bal. | 0.40 | 1.8 | 2.0 | 0.0294 | 0.0117 | 0.0013 | 0.0025 | | 0.2 | Yes |
| 30 | Ex. | Bal. | 0.40 | 1.8 | 2.0 | 0.0158 | 0.0164 | 0.0014 | 0.0016 | Zr: 0.030 | 0.1 | Yes |
| 31 | Ex | Bal. | 0.40 | 1.8 | 2.0 | 0.0210 | 0.0187 | 0.0014 | 0.0021 | Ni: 0.90 | 0.3 | Yes |
| 32 | Comp. ex. | Bal. | 0.40 | 1.8 | 2.0 | 0.0203 | 0.0187 | 0.0014 | 0.0016 | | 0.3 | Yes |

Bold underlines indicate outside scope of present invention or off from preferable range.

TABLE 1-2

| | | Annealing conditions | | | Γ phase | α phase | | Number of | Oxide | Spot |
|---|---|---|---|---|---|---|---|---|---|---|
| No. | Tension | Dew point (° C.) | Holding temp. (° C.) | Holding time (s) | area ratio (%) | area ratio (%) | Oxides (%) | coarse oxides (no.) | maximum diameter | welded part corrosion resistance |
| 1 | Yes | 0 | 800 | 80 | 0 | 100 | 0 | 0 | — | P |
| 2 | Yes | 0 | 800 | 100 | 80 | 5 | 15 | 3 | 4.2 | VG |
| 3 | Yes | 0 | 820 | 100 | 68 | 6 | 26 | 5 | 6.3 | VG |
| 4 | Yes | 0 | 830 | 100 | 53 | 35 | 12 | 3 | 0.5 | G |
| 5 | Yes | 0 | 800 | 100 | 64 | 15 | 21 | 4 | 5.6 | VG |
| 6 | Yes | 0 | 800 | 100 | 61 | 22 | 17 | 4 | 1.1 | G |
| 7 | Yes | 0 | 900 | 100 | 65 | 22 | 13 | 2 | 4.4 | VG |
| 8 | Yes | 0 | 800 | 100 | 54 | 19 | 27 | 5 | 5.6 | VG |
| 9 | Yes | −40 | 800 | 110 | 0 | 100 | 0 | 0 | — | P |
| 10 | Yes | 20 | 810 | 90 | 15 | 72 | 13 | 1 | 3.7 | P |
| 11 | Yes | 0 | 650 | 100 | 51 | 49 | 0 | 0 | — | P |
| 12 | Yes | 0 | 800 | 350 | 11 | 89 | 0 | 0 | — | P |
| 13 | Yes | 0 | 800 | 5 | 52 | 48 | 0 | 0 | — | P |
| 14 | Yes | 0 | 930 | 100 | 18 | 65 | 17 | 1 | 4.1 | P |
| 15 | Yes | 0 | 820 | 100 | 15 | 71 | 14 | 2 | 4 | P |
| 16 | Yes | 0 | 790 | 100 | 14 | 64 | 22 | 2 | 3.5 | P |
| 17 | Yes | 0 | 810 | 100 | 0 | 100 | 0 | 0 | — | P |
| 18 | Yes | 0 | 840 | 100 | 52 | 19 | 29 | 6 | 6.1 | VG |
| 19 | Yes | 0 | 840 | 100 | 50 | 26 | 24 | 4 | 5.3 | VG |
| 20 | Yes | 0 | 700 | 300 | 42 | 40 | 18 | 3 | 3.6 | VG |
| 21 | Yes | 0 | 840 | 100 | 44 | 31 | 25 | 5 | 4.9 | VG |
| 22 | Yes | 0 | 840 | 100 | 41 | 36 | 23 | 4 | 5.0 | VG |
| 23 | Yes | 0 | 840 | 100 | 33 | 41 | 26 | 5 | 4.6 | VG |
| 24 | Yes | 0 | 900 | 10 | 36 | 46 | 18 | 5 | 5.3 | VG |
| 25 | Yes | 0 | 840 | 100 | 42 | 50 | 8 | 2 | 6.7 | VG |
| 26 | Yes | 0 | 800 | 120 | 46 | 43 | 11 | 3 | 8.2 | VG |
| 27 | Yes | 0 | 840 | 100 | 31 | 41 | 28 | 5 | 6.5 | VG |
| 28 | Yes | 0 | 780 | 150 | 27 | 40 | 33 | 6 | 7.8 | VG |
| 29 | Yes | 0 | 840 | 100 | 30 | 45 | 25 | 5 | 8.1 | VG |
| 30 | Yes | 0 | 720 | 170 | 23 | 50 | 27 | 5 | 7.8 | VG |
| 31 | Yes | 0 | 840 | 100 | 20 | 49 | 31 | 6 | 8.9 | VG |
| 32 | No | 0 | 840 | 100 | 16 | 84 | 0 | 0 | — | P |

Bold underlines indicate outside scope of present invention or off from preferable range.

In each of Sample Nos. 2 to 8 and 18 to 31, the chemical composition of the steel material, the area ratio of the Γ phase, and the requirements of coarse oxides were all satisfied, therefore a high corrosion resistance of the spot weld was provided. On the other hand, in Sample No. 1, grinding was not performed before annealing, therefore internal oxides were not sufficiently formed at the time of annealing and the desired Γ phase and coarse oxides were not formed at the near end part region. Therefore, the corrosion resistance of the spot weld was insufficient. In Sample No. 9, the dew point at the time of annealing was low, the plating layer was not suitably formed, and the desired Γ phase and coarse oxides were not formed at the near end part region, therefore the corrosion resistance of the spot weld was insufficient. In Sample No. 10, the dew point at the time of annealing was high, internal oxides were not sufficiently formed at the time of annealing, and the desired Γ phase was not formed at the near end part region, therefore the corrosion resistance of the spot weld was insufficient. In Sample No. 11 the holding temperature at the time of annealing was low, internal oxides were not sufficiently formed at the time of annealing, and the desired coarse oxides were not formed at the near end part region, therefore the corrosion resistance of the spot weld was insufficient. In Sample No. 12, the holding time at the time of annealing was long, an external oxidation layer was formed at the time of annealing, and the desired Γ phase was not formed at the near end part region, therefore the corrosion resistance of the spot weld was insufficient. In Sample No. 13, the holding time at the time of annealing was short, internal oxides were not sufficiently formed at the time of annealing, the desired oxides were not formed at the near end part region, therefore the corrosion resistance of the spot weld was insufficient. In Sample No. 14, the holding temperature at the time of annealing was high, an external oxidation layer was formed at the time of annealing, and the desired Γ phase was not formed at the near end part region, therefore the corrosion resistance of the spot weld was insufficient. In Sample No. 15, the amount of Si was excessive, an external oxidation layer was formed at the time of annealing, the plating layer was not suitably formed, and the desired Γ phase was not formed at the near end part region, therefore the corrosion resistance of the spot weld was insufficient. In Sample No. 16, the amount of Mn was excessive, an external oxidation layer was formed at the time of annealing, the plating layer was not suitably formed, and the desired Γ phase was not formed at the near end part region, therefore the corrosion resistance of the spot weld was insufficient. In Sample No. 17, the internal oxidation layer at the time of annealing was thick, the plating layer was not suitably formed, and the desired Γ phase and oxides were not formed in the near end part region, so the corrosion resistance of the spot weld was insufficient. In Sample No. 32, predetermined tension was not applied at the time of annealing, therefore internal oxides were not sufficiently formed at the time of annealing and the desired Γ phase and coarse oxides were not formed at the near end part region. For this reason, the corrosion resistance of the spot weld was insufficient.

INDUSTRIAL APPLICABILITY

According to the present invention, it becomes possible to provide a steel welded member having high corrosion resistance of a spot weld, the steel welded member can be suitably used for automobiles, building materials, and other applications, in particular for automobiles, exhibiting a high corrosion resistance as a steel welded member for automotive use, and promising longer life. Therefore, the present invention can be said to be an invention extremely high in value in industry.

REFERENCE NOTATIONS

1 steel welded member
11 Zn-based plated steel material
13 oxides
15 Γ phase
17 α phase
21 spot weld
23 nugget
25 pressure weld
27 end part of pressure weld
29 region near end part (region up to 0.5 mm from end part of pressure weld)

The invention claimed is:

1. A steel welded member comprising a plurality of Zn-based plated steel materials, each having a Zn-based plating layer on a surface of a steel material, joined together through at least one spot weld, wherein
the steel material has a chemical composition comprising, by mass %,
C: 0.05 to 0.40%,
Si: 0.2 to 3.0%,
Mn: 0.1 to 5.0%,
sol. Al: 0 to less than 0.4000%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%,
REM: 0 to 0.100% and
a balance of Fe and impurities, and
the steel welded member comprises, by area ratio, 20 to 80% of a Γ phase ($Fe_3Zn_{10}$) and at least one oxide with a long axis of 0.5 μm or more in a region up to 0.5 mm from an end part of a pressure weld of the spot weld.

2. The steel welded member according to claim 1, wherein the steel welded member comprises at least one oxide with a long axis of 1.5 to 10.0 μm in the region.

3. The steel welded member according to claim 1, wherein the steel welded member further comprises, by area ratio, 5 to 50% of an α phase in the region.

4. The steel welded member according to claim 2, wherein the steel welded member further comprises, by area ratio, 5 to 50% of an α phase in the region.

* * * * *